US006682361B2

(12) United States Patent
Zweigle

(10) Patent No.: US 6,682,361 B2
(45) Date of Patent: Jan. 27, 2004

(54) LOCKING SLIDE FOR PLUG PARTS OF ELECTRIC PLUG-CONNECTION ELEMENTS

(75) Inventor: Peter Zweigle, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/908,416

(22) Filed: Jul. 18, 2001

(65) Prior Publication Data

US 2003/0017738 A1 Jan. 23, 2003

(30) Foreign Application Priority Data

Jul. 18, 2000 (DE) .................................... 200 12 400 U

(51) Int. Cl.[7] .................................................. A01R 4/50
(52) U.S. Cl. ....................................... 439/347; 439/752
(58) Field of Search ................................ 439/347, 345, 439/595, 752

(56) References Cited

U.S. PATENT DOCUMENTS 5,207,593 A * 5/1993 Bogiel ........................ 439/345
6,171,150 B1 * 1/2001 Saito et al. ................. 439/352

* cited by examiner

*Primary Examiner*—Tho D. Ta
*Assistant Examiner*—Briggitte Hammond
(74) *Attorney, Agent, or Firm*—Kenyon & Kenyon

(57) ABSTRACT

Locking slides of plug connections are retained in the closed position by one or more hooks. In addition, the same detent hook, with the cooperation of a stop element, prevents the locking slide from falling out of plug part. To ensure reliable functioning of the locking slide, even over longer periods of time, a locking slide is configured with two detent hooks, one detent hook being arranged on the one side of the plug part and the other detent hook being arranged on the other side of the plug part. One detent hook is provided exclusively for the latching in the closed position, and the other detent hook is provided exclusively for the cooperation with a stop element.

4 Claims, 2 Drawing Sheets

LOCKING SLIDE FOR PLUG PARTS OF ELECTRIC PLUG-CONNECTION ELEMENTS

FIELD OF THE INVENTION

The present invention relates to a locking slide for producing a releasable plug connection of plug parts. The locking slide is disposed in a manner that it is able to slide in a plug part, can be brought from a first open position into a further closed position and cooperates with the further plug part. In a closed position of the locking slide, at least one detent hook, arranged on the plug part, cooperates with a catch recess configured on the locking slide. A stop element is provided which cooperates with the detent hook in the open position of the locking slide.

BACKGROUND INFORMATION

Locking slides are used to safeguard an electrical connection between two plug parts, so that this connection is not inadvertently released. The locking slide is able to be brought from an open position into a closed position. To prevent the locking slide from moving or releasing the closed position in any other way whatsoever in response to shaking, at least one detent hook is provided which cooperates with a catch recess on the locking-slide side in the closed position of the locking slide. The detent hook is disposed on one side of the plug part and, when slipping the locking slide onto the plug part, will slide onto a leading slant arranged at the end of the locking slide, and specifically, until the detent hook is able to grip the leading slant from behind.

By further shifting of the locking slide in the direction of the closed position, the detent hook glides on another surface up to a further stop face. Upon reaching the closed position, the detent hook locks into a recess provided on the part of the locking slide.

Generally, the locking slide has a symmetrical design. This means that the slide direction onto the plug part is independent, so that a slide operation can be performed both from the left and on the right side, and the corresponding latching is effected. To that end, corresponding leading slants are provided both on the one side and on the other side, and a catch recess is also provided with which the detent hooks can engage.

A disadvantage of this design is that, because of the relaxation of the plastic material, the detent hooks can lose their corresponding function. This occurs, in particular, when the locking slide remains in one position over a long time, during which the detent hook rests on a leading slant. The danger thereby exists that the corresponding latching, that is to say, the positive locking in the closed position, is no longer present, and therefore the slide is no longer properly guaranteed.

SUMMARY

An object of the present invention is to provide a latching for the locking slide in such a way that reliable functioning is fulfilled both in the closed position and in the open position.

Therefore, in accordance with an example embodiment of the present invention, two detent hooks are formed on the plug part; one detent hook is assigned exclusively to the latching for the closed position, and the other detent hook is assigned to the stop element in the open position.

In plug parts whose locking slides can be inserted from the right or the left depending on spatial conditions, two detent hooks are arranged in the plug housing. This means that one detent hook is arranged on one side of the plug housing, the other detent hook being disposed on the opposite side of the plug housing. However, on the locking slide itself, a catch recess is provided only on one side, the catch recess cooperating with the one detent hook in the closed position of the locking slide. Arranged on the other side of the locking slide is the stop element which interacts with the further detent hook in the open position.

Consequently, both functions are independent of one another, and the corresponding detent hooks take over the corresponding functions depending on the installation of the locking slide to the right or to the left.

DETAILED DESCRIPTION

Figure 1:
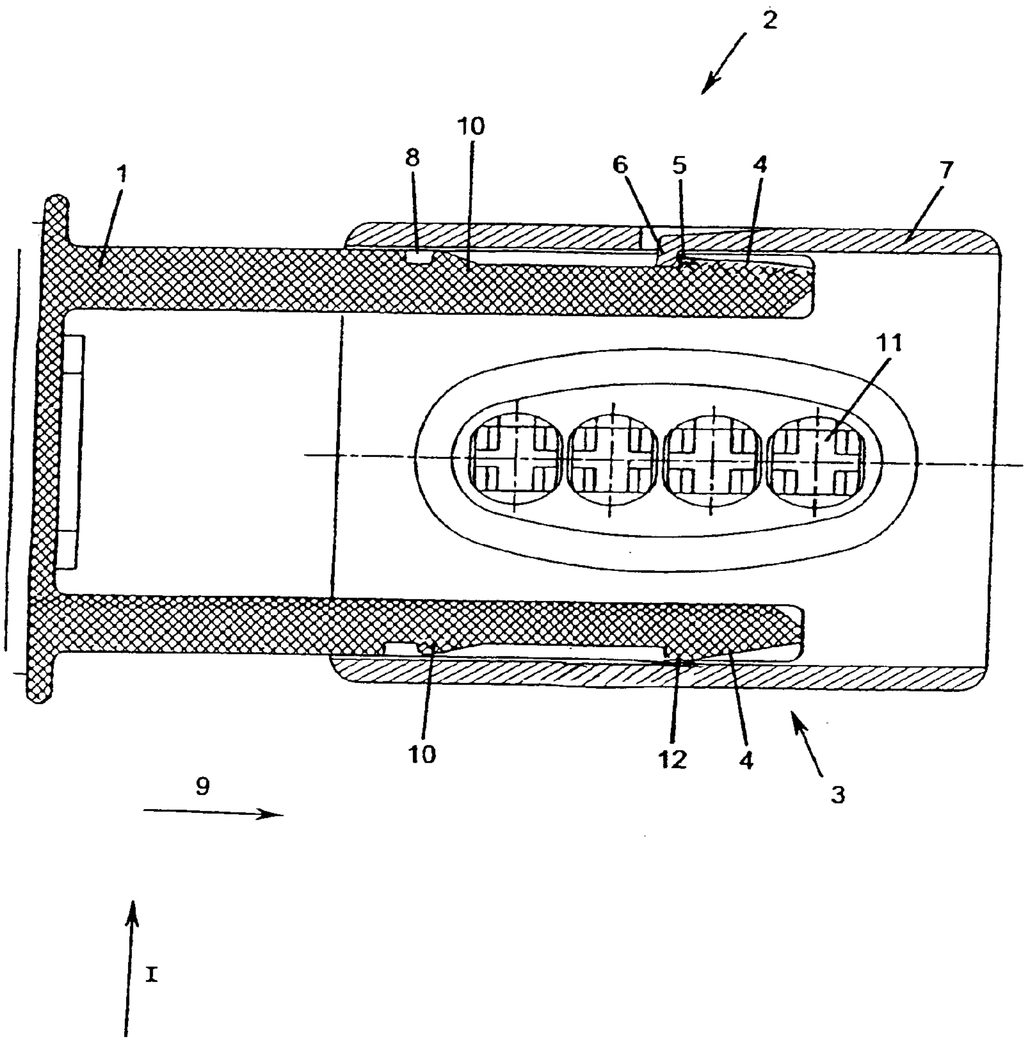
FIG. 1 shows a conventional locking slide for a plug part of an electrical plug connection in the open position.

FIG. 1 shows a conventional locking slide. Locking slide 1 is arranged in a first position I in a plug part 2.

This first position corresponds to the open position of locking slide 1.

At its end 3, locking slide 1 includes a leading slant 4 which then terminates with a shoulder 5. A detent hook 6, arranged on the side of plug housing 7 of plug part 2, grips this shoulder 5 from behind. At least one catch recess 8 is also provided on locking slide 1. Provided in slide direction 9 in front of catch recess 8 is a further leading slant 10, upon which detent hook 6 then glides accordingly during the insertion in arrow direction 9 until it locks into catch recess 8.

Detent hook 6 is constructed as a spring-like element in plug housing 7 of plug part 2, and is only configured on one side of plug part 2.

Figure 2:
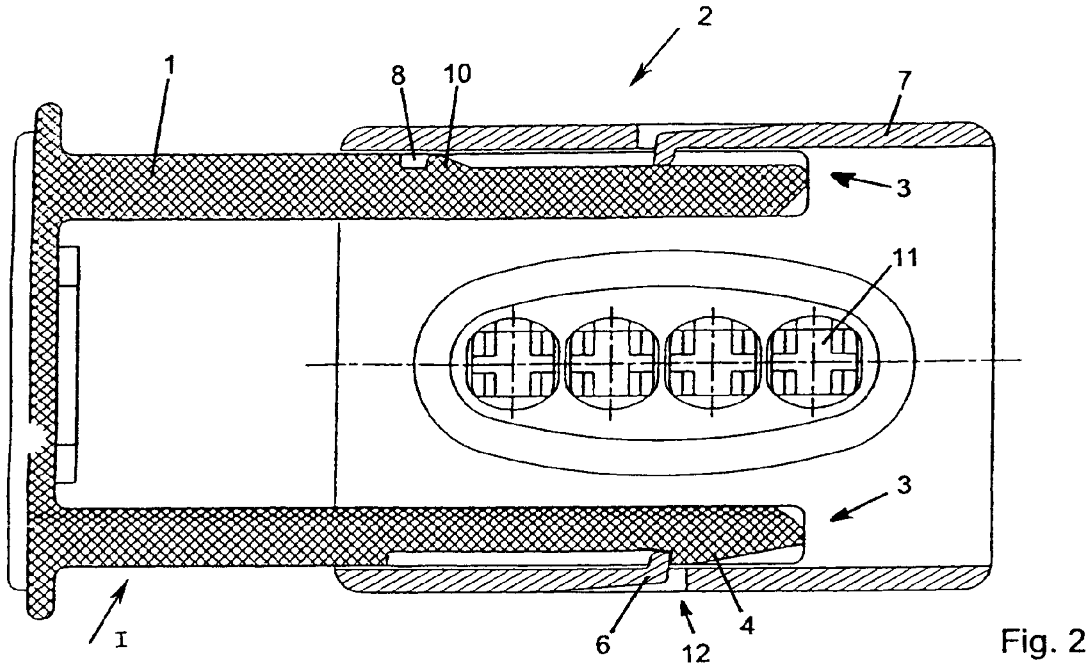
FIG. 2 shows a schematic representation of a locking slide according to an example embodiment of the present invention in the open position.
Figure 3:
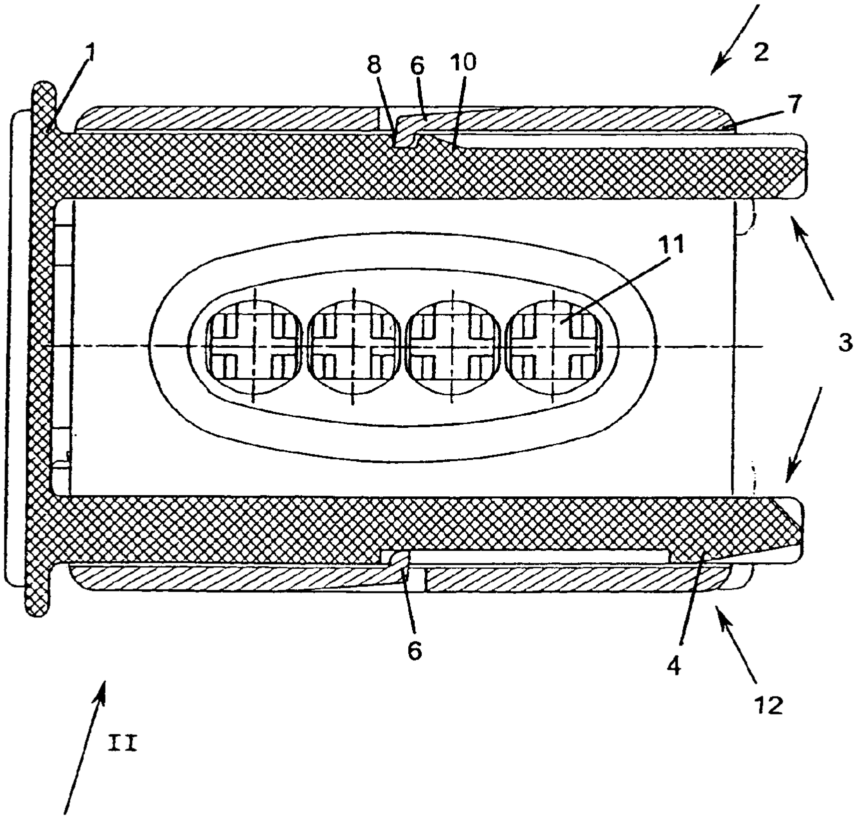
FIG. 3 shows the locking slide of FIG. 2 in the closed position.

FIGS. 2 and 3 show an example embodiment of the present invention. In this example embodiment, a detent hook 6 is arranged on both sides of plug part 2. Detent hooks 6 configured on both sides of plug part 2 are arranged relative to each other in such a way that one detent hook 6 extends from the one side of plug part 2, for example, from the left side, and the other detent hook 6 extends correspondingly from the right side on the other side of plug part 2. However, it is also possible for both detent hooks 6 to extend from one side, e.g., from the left or from the right side.

According to the example embodiment of the present invention, the formation of the two detent hooks 6 is provided such that one detent hook 6 in the open position I, as is shown in FIG. 2, cooperates with a stop element 12. Stop element 12 is provided to prevent slide element 1 from being pulled out of first plug part 2.

On the other hand, in the closed position II as is shown in FIG. 3, the other detent element now cooperates with the catch recess on the side of locking slide 1, whereas the first detent element is out of function in this position of locking slide 1.

The locking slide 1 according to the present invention, having the two detent elements, is usable for all locking slides 1. In this context, it does not matter whether locking slide 1 is put onto the plug part from the left side or from the right side.

What is claimed is:

1. A releasable plug connection of plug parts, comprising:

a plug part including two detent hooks; and a locking slide disposed to slide in the plug part, the locking slide having an open position and a closed position, the locking slide including a catch recess and a stop element, a first one of the detent hooks being assigned exclusively to the closed position and cooperating with the catch recess in the closed position, a second one of the detent hooks cooperating with the stop element in the open position.

2. The releasable plug connection according to claim 1, wherein an end of the locking slide includes a leading slant upon which the second one of the detent hooks glides during an insertion of the locking slide into the plug part until the second one of the detent hooks grips the leading slant from behind.

3. The releasable plug connection according to claim 1, wherein the locking slide includes a leading slant arranged directly in front of the catch recess in a direction of the closed position.

4. The releasable plug connection of claim 1, wherein the locking slide is insertable from at least one of a first side of the plug part and a second side of the plug part opposite to the first side.

* * * * *